May 19, 1970     H. S. POTTS     3,513,326
WIND MOTOR WHEEL
Filed May 22, 1967     3 Sheets-Sheet 1
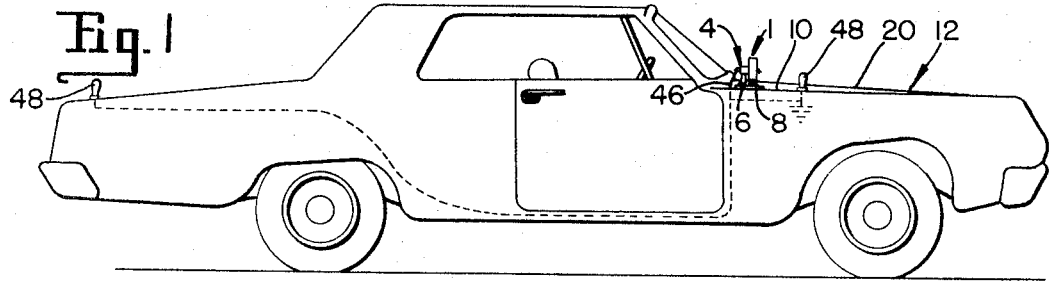
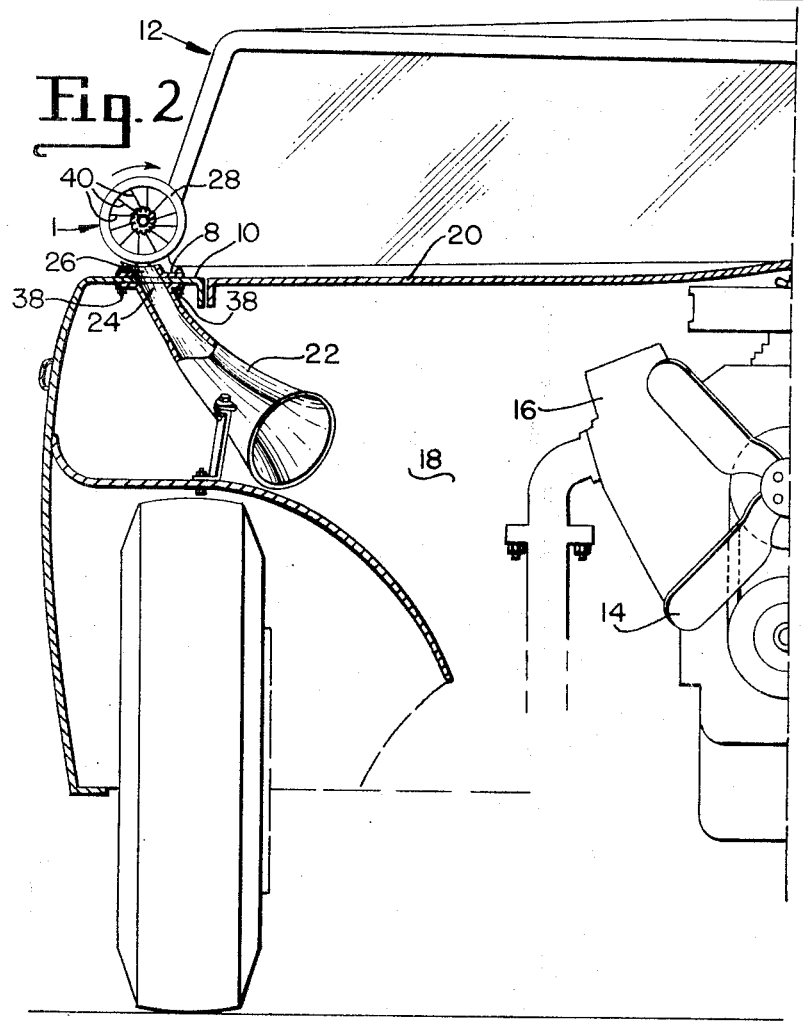
HAROLD S. POTTS
INVENTOR.
BY
Wayland D. Keith
HIS AGENT

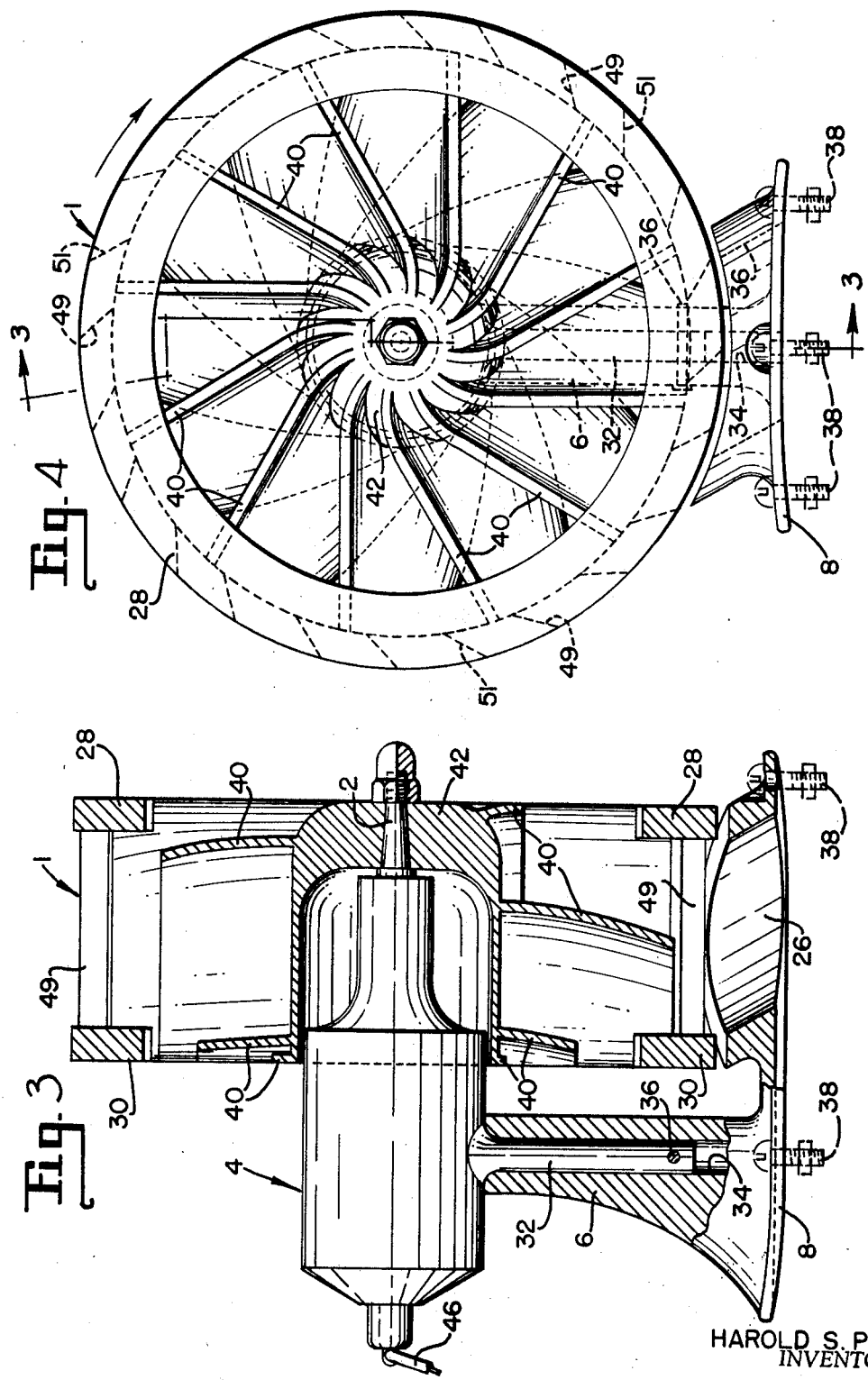

May 19, 1970     H. S. POTTS     3,513,326
WIND MOTOR WHEEL
Filed May 22, 1967     3 Sheets-Sheet 3
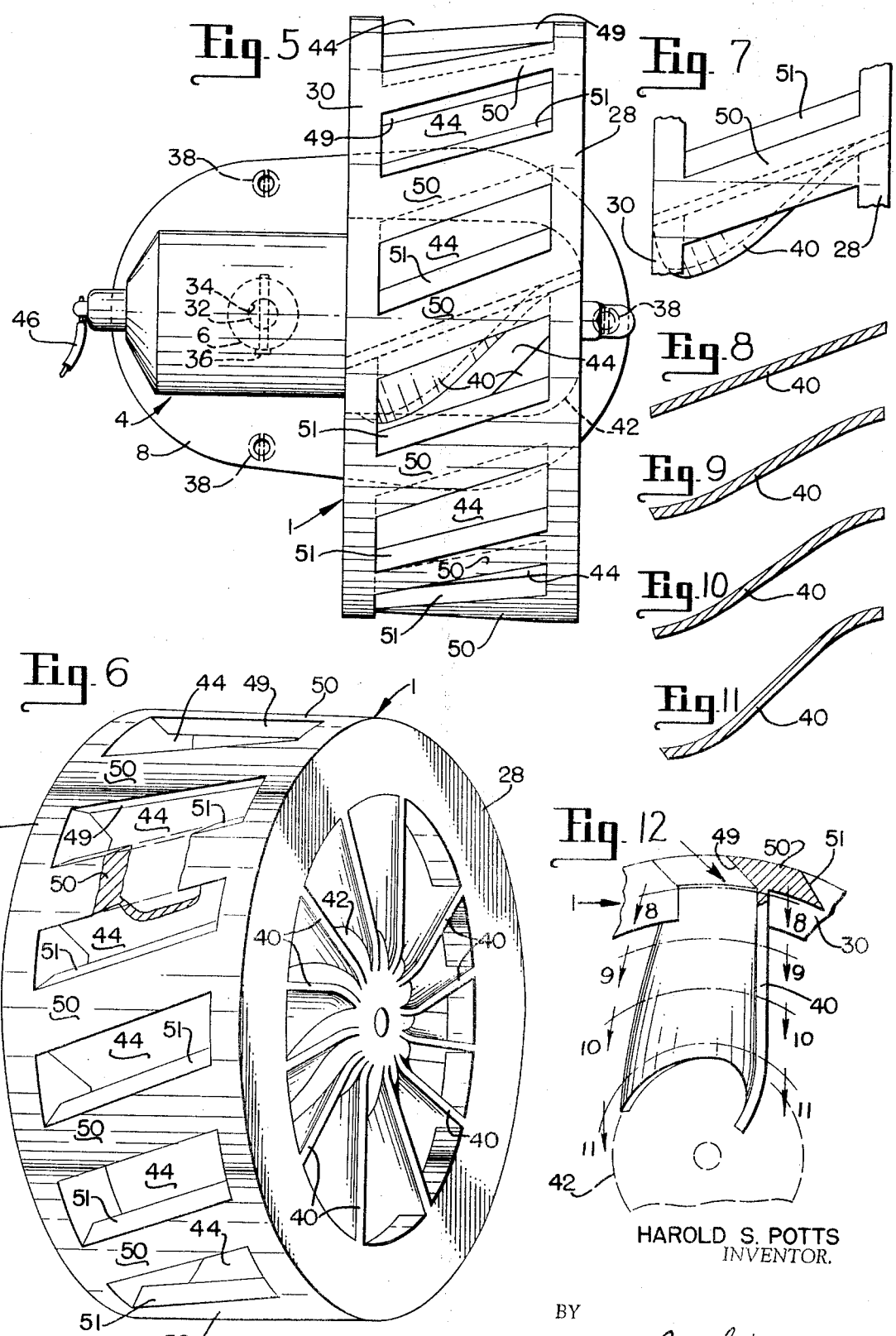
HAROLD S. POTTS
INVENTOR.
BY
Wayland D. Keith
HIS AGENT

United States Patent Office

3,513,326
Patented May 19, 1970

3,513,326
WIND MOTOR WHEEL
Harold S. Potts, P.O. Box 514,
Healdton, Okla. 73438
Filed May 22, 1967, Ser. No. 640,263
Int. Cl. F03d 9/00
U.S. Cl. 290—55                                    3 Claims

ABSTRACT OF THE DISCLOSURE

A wind motor wheel which preferably drives an electrical generator, in one form of the invention, to receive air pressure generated by the motor fan, particularly while the vehicle is standing still and the motor is running, to operate the wind wheel to generate electrical current, and to receive air pressure axially of the wind wheel while the vehicle is moving over the terrain, over the water, or through the air, to provide additional power to drive an electrical generator to provide a source of electricity independently of the battery system of the vehicle. A modified form of the invention shows the use of a motor to drive a wind wheel to exhaust air from beneath the hood of the vehicle, which motor may be driven by a source of electricity connected to the wires extending therefrom.

---

This invention relates to wind motor wheels and more particularly to wind motor wheels to accomplish a maximum driving torque for a minimum wind pressure expended. The present wind motor wheel may be used for driving various powered elements, such as electric generators and the like.

The present invention is so constructed that it may receive wind to turn the wind motor wheel, either axially thereof or radially thereinto, and it is particularly adaptable to such uses as axially turning an electric generator on an automobile with sufficient power capacity to allow two or more lights to burn continuously, without drain on the battery, while running the automobile.

Various wind driven wheels have been proposed heretofore, but these, for the most part, embodied large wheel mechanisms which were driven by wind blowing on to the wheel in a direction substantially parallel with the axis thereof or substantially at a right angle thereto. The present wind motor wheel, however, may be turned by wind power with the wind being directed thereonto from two directions, either independently or simultaneously.

An object of this invention is to provide a wind motor wheel which is adapted to receive wind pressure thereonto from two directions, either simultaneously or independently so as to drive the wind motor wheel.

Still another object of the invention is to provide a wind motor wheel which is so constructed as to have a flywheel effect while running, to carry the momentum of the wheel over heavy work spots, such as the poles of a dynamo or an electric generator.

Still another object of the invention is to provide a wind motor wheel which has each vane angulated in a plurality of angles.

Still another object of the invention is to provide a wind driven electric generator which is adapted to be mounted on a movable vehicle, such as an automobile, truck, or airplane, which generator has a horn-like member to direct air onto the periphery of the wind motor wheel from a source of air generated by a fan, blower or the like, independently of the forward movement of the vehicle.

Another object of the invention is to provide a wind motor wheel and an electric generator unit adapted to be mounted on a vehicle, so that both the air passing rearward from the fan and out of the hood and the air passing axially into the forward side of the wind motor wheel will rotate the wind motor wheel and the electric generator.

Another object of the invention is to provide a ventilation system for the hood of the motor vehicle to exhaust heat and gases therefrom so as to give longer life to belts, hose, wiring, bearings and the like.

Still a further object of the invention is to provide a wind wheel which may be driven by a motor, to effect a power action, to move an object to which it is attached, either through the air, on the water, or over the terrain.

With these objects in mind and others which will become manifest as the description proceeds, reference is to be had to the accompanying drawings in which like reference characters designate like parts in the several views thereof, in which:

FIG. 1 is a side elevational view of a vehicle showing a wind motor wheel and an electric generator installed thereon, with an electric wire leading from the generator to safety lights positioned on the vehicle;

FIG. 2 is a sectional view taken transversely through the hood portion of a motor vehicle, with parts broken away and parts shown in elevation;

FIG. 3 is an enlarged sectional view taken on line 3—3 of FIG. 4, with parts broken away, with parts shown in elevation to bring out the details of construction of the wind motor wheel and an electric generator, and showing the mounting therefor;

FIG. 4 is a front elevational view of the wind motor wheel, for a vehicle, the support assembly being shown apart from the vehicle;

FIG. 5 is a top plan view of the wind motor wheel, the electric generator assembly, and mounting bracket therefor, shown apart from the vehicle;

FIG. 6 is a perspective view of the wind motor wheel, shown apart from the electric generator, with parts being broken away and shown in section to bring out the details of construction;

FIG. 7 is a fragmentary portion of the wind motor wheel, showing one of the vanes to show the transition angle thereof from 22½ degrees to 45 degrees;

FIGS. 8, 9, 10, 11 are shown as the respective sections taken on FIG. 12, and showing the angularity of transition from substantially 22½ degrees to 45 degrees; and FIG. 12 is a fragmentary view of the wind motor wheel, showing a single vane shown apart from the wind motor wheel, showing a fragmentary portion of the rims of the wind motor wheel.

With more detailed reference to the drawings the numeral 1 designates generally a wind motor wheel which is shown to be mounted on a shaft 2 of an electric generator, designated generally by the numeral 4. The generator 4 is shown to be mounted on a support bracket 6 which has a base 8 to complementally fit on a surface, such as the cowl 10 of an automobile, designated generally by the numeral 12. The automobile is shown to have a fan 14 which is rotated by the engine 16 thereof so as to develop air pressure within compartment 18 beneath the hood 20. A funnel-shaped member 22 is positioned within compartment 18 so the air pressure generated by fan 14 and by the air passing through the radiator (not shown) will be directed into the funnel-shaped member 22 and discharged through opening 24 thereof into an opening or orifice 26 in the base 8 of support bracket 6, which supports the generator 4 and motor wind wheel 1.

The wind wheel 1 has a rim 28 on the forward side thereof and rim 30 on the rearward side thereof to form a mass so as to cause a flywheel effect, to cause the motor wind wheel to rotate smoothly when operating a dynamo or an electric generator, as, when the wind wheel is once rotating, these weighted rims 28 and 30 will furnish sufficient inertia to overcome the magnetic pull, when the magnetic lines of force of the armature segments cut the lines of force of the magnetic fields in the generator, the current will be more uniformly generated.

The generator 4 may either be of the permanent magnet type or of the wound field type; however it is of a character that may be readily mounted on support 6 by slipping a vertical shaft 32 into a complementary hole 34, in support 6, whereupon a pin 36 may be passed through the support 6 to hold the generator in a rigid position on support 6. Bolts 38 are provided to secure the base 8 to the cowl 10 of the automobile 12, as will best be seen in FIG. 2. The wind motor wheel 1 may be made in various sizes and with a varying number of vanes, which vanes are indicated by the numeral 40. The vanes extend outward from a round-nosed hub 42, and terminate between rims 28 and 30. The outer periphery of the wind motor wheel 1 has angulated slots 44 formed therein with the angulation of the blades or vanes 40 being approximately 22½ degrees with respect to axis at the outer periphery. Each blade has an angulation of approximately 45 degrees at the periphery of the hub 42, with a transition angulation curve within the length of each blade or vane, which will enable the wind pressure to pass through slots 44 to act directly on the 22½ degree angle of the blade or vane 40 at the periphery thereof, upon the air passing out through angulated orifice or hole 26 in the base 8, as will best be seen in FIGS. 2 and 4. This will enable the air pressure generated by the fan to initially operate the wind motor wheel 1 even while the vehicle is not moving, which will cause the generator armature, within generator 4, to rotate and direct current out through wire 46, thence to the respective safety lights 48, thence through the ground on the lights thence back to the ground of base 8 and generator 4.

The wind wheel, as particularly shown in FIGS. 5 through 12, provides distinctive vanes that are arranged circumferentially about a hub so that the wheel will be rotated by the force of the air directed against the wheel at substantially right angles to the axle or shaft 2. The air outlet hole 26, in the base 8 of the wheel, is formed at such angle that the air from beneath the hood 20 will rotate the wind wheel 1, and as the pressure of the air increases, either tangentially or axially, the wheel will rotate faster to generate a maximum amount of current for the size and construction of the wheel, and by the wind passing axially therethrough as the vehicle moves. Outwardly extending lips 49, between rims 28 and 30 of the wind motor wheel 1, direct air inwardly from the periphery to add power, receding shoulders 51, formed between rims 28 and 30, permits air to move through slots 50 with a minimum of impedence.

As the vehicle moves over the terrain or through the air, the air passing through the forward side of the wind wheel and through the vanes 40 will cause the rotation of the wheel in the direction indicated by the arrows in FIGS. 2 and 4, thereby the present system is entirely independent of the battery, and of the electrical system presently in use on vehicles. Furthermore, the vanes of wind motor wheel, rotating on the cowl 10 of a car 12, will pick up the reflection from a light 48 adjacent the rotating wind motor wheel and will make an on-coming motorist aware of an approaching vehicle, which will present a further safety factor. Furthermore, an on-coming motorist will be alerted and thereby prevent car hypnosis, as the impeller blades or vanes may be plated so as to be bright or the blades may present a banded color pattern, such as a spiral or the like.

It is to be particularly pointed out that the transition of the blades from substantially 22½ degrees, as shown in FIG. 8, through the various angulations to approximately 45 degrees as shown in FIG. 11, the blade or vane acquires a spiral-like curve, as will best be seen in FIGS. 4, 5, 6, and 12, which will give maximum use of the wind pressure impressed thereupon. At the terminal end of each of the blades, an angulated portion 50 is formed on the upper side thereof, so as to define a slot 44 of definite width, to allow air to pass from funnel shaped member or conduit 22 into and through opening 26, thereby to present the greatest wind pressure at the proper angle on the wind motor wheel 1 from the fan 14 by the air coming through the radiator (not shown) into compartment 18.

The present wind motor wheel, which drives generator 4, as connected to an automobile, would preferably develop 3 to 12 watts, possibly more, of electricity, normally at 6 to 12 volts, which would preferably light three, high intensity, safety light bulbs 48, which could be of a desired color and which could have reflectors or luminesent paint thereon, if desired. In this manner several lights may be lighted and displayed, both day and night, without the necessity of having to remember to turn these on or turn them off, as no drain on the battery of the car would occur if these lights were not turned off.

MODIFICATION

The modified form of the invention is the same as shown in the several views herein, and the like parts carry the same numerals, as shown on the previously described form of the invention, except the part designated at 4 is a prime mover or motor and may be supplied with electrical current through wires 46 to rotate the wind wheel which has sufficient speed to withdraw air from beneath the hood 20 through air outlet 24 and 26 to properly ventilate the hood. The prime mover or motor 4 is mounted in the same manner as the generator, in the aforementioned form of the invention, the only structural change being that the unit 4 becomes a prime mover, preferably an electric motor, and is powered by current directed through wires 46 to the motor 4.

The wind wheel may be driven by a conventional motor, such as indicated at 4, instead of the unit being an electric generator, in which case, the wind wheel 1 would draw air through the wind wheel to exhaust air from beneath the hood of the vehicle. The size of the prime mover or motor, such as indicated at 4 and the size of the wind wheel, as indicated at 1, may vary to produce the desired suction to draw air from beneath hood 20 and through wind wheel 1.

Having thus clearly shown and described the invention, what is claimed as new and desired to be secured by Letters Patent is:

1. An air pressure powered wind wheel driven by dual air pressures, in combination with an engine having a fan connected in driven relation therewith, which wind wheel comprises;
   (a) a support bracket mounted exteriorly of the surface of a vehicle,
   (b) an electric generator mounted on said support bracket,
       (1) a shaft rotatably mounted in said electric generator and having the axis thereof parallel to the line of movement of the vehicle when the vehicle is in motion,
   (c) a wind powered wheel mounted on said generator shaft and being rotatable therewith,
       (1) said wind powered wheel having radiating vanes to rotate said wheel by the pressure of air as the vehicle moves over the terrain,
       (2) the engine and the fan of the vehicle being enclosed by a hood,
       (3) said wind powered wheel having further vanes on the periphery thereof, which vanes are positioned parallel to the axis of said wind wheel, and
       (4) a conduit forming an opening from the enclosed hood to a position radially exterior of said wind powered wheel, so air under pressure may be directed angularly to a side of said wind powered wheel onto said further vanes, by the fan of the engine, independently of air pressure directed axially onto the wind powered wheel by the movement of the vehicle over the terrain.

2. An air pressure producing wheel to be driven by a prime mover, which comprises;
   (a) a base mounting the prime mover,
   (b) a shaft journaled in the prime mover,
   (c) a wind wheel mounted on said shaft, which wind wheel comprises,
      (1) a hub,
      (2) radial, angulated vanes extending from said hub,
      (3) the vanes being so angulated as to pull air thereinto from different angles to create air pressure, and
   (d) the prime mover being connected in power driving relation with said wind wheel to rotate the wheel to draw air therethrough to be discharged therefrom.

3. A wind powered motor for use in combination with a machine, as defined in claim 1; wherein (a) a funnel shaped conduit is positioned so as to be in fluid communication with said opening in said base and with the source producing the air pressure,
   (1) the large end of said funnel shaped conduit extending toward the fan producing air pressure.

References Cited

UNITED STATES PATENTS

| | | |
|---|---|---|
| 1,709,684 | 4/1929 | Possin. |
| 2,555,807 | 6/1951 | Morris. |
| 3,098,355 | 7/1963 | Varadi et al. _____ 60—39.14 |
| 3,323,775 | 6/1967 | Snell _____ 253—77 |

THOMAS E. LYNCH, Primary Examiner

W. E. DUNCANSON, Jr., Assistant Examiner

U.S. Cl. X.R.

253—39, 96